Aug. 25, 1942.  W. W. HIGHAM ET AL  2,294,030
HEAT EXCHANGE DEVICE
Filed March 9, 1940  2 Sheets—Sheet 1
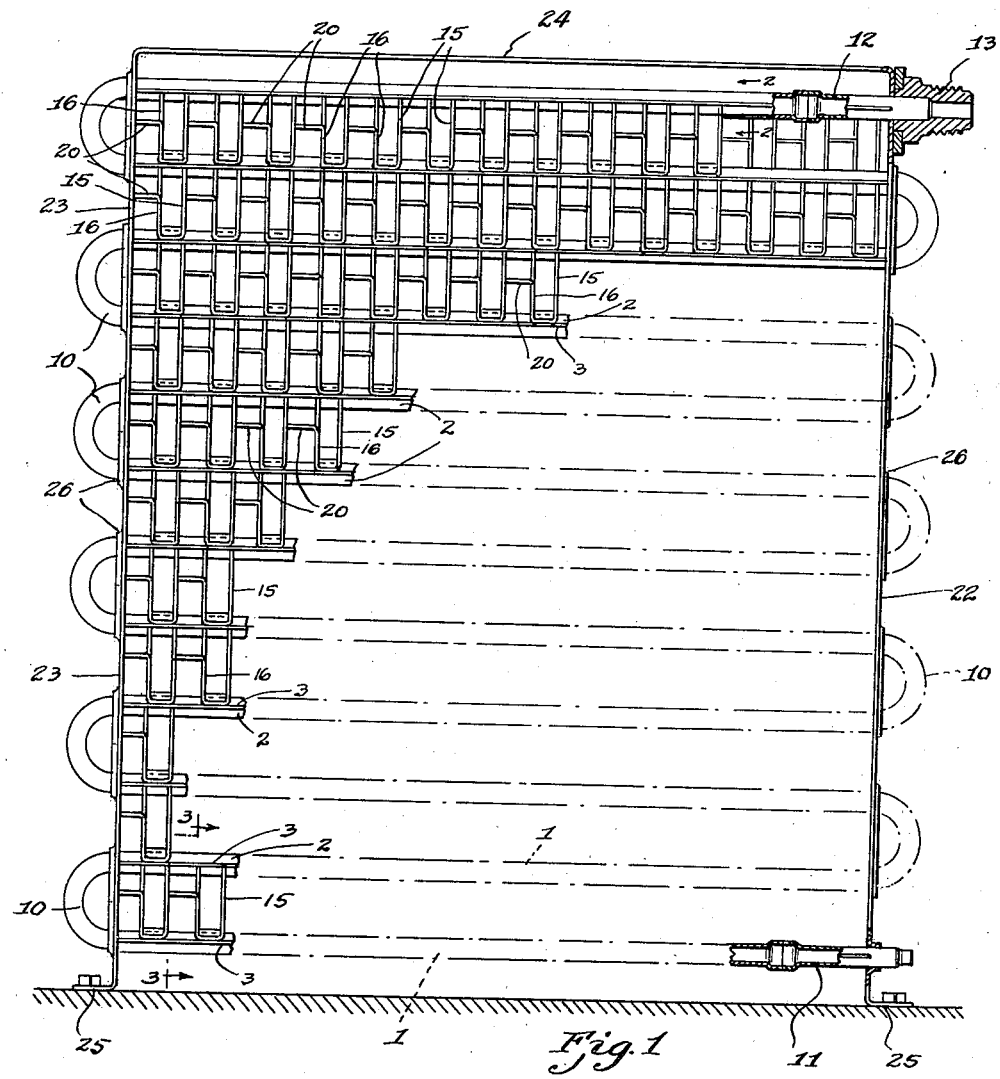
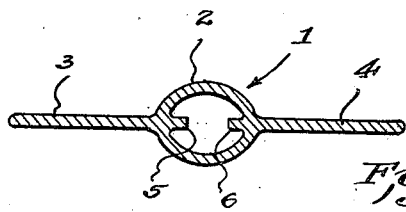
INVENTORS
William W. Higham
Thomas S. Pendergast
BY
Barnes, Kisselle, Laughlin & Raisch
Attorneys Aug. 25, 1942.    W. W. HIGHAM ET AL    2,294,030
HEAT EXCHANGE DEVICE
Filed March 9, 1940    2 Sheets-Sheet 2
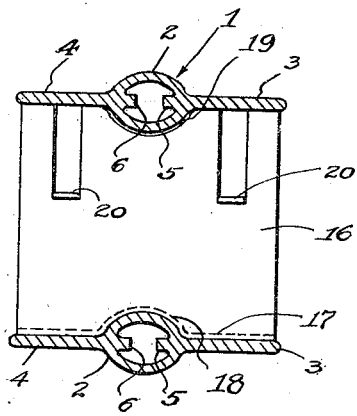
Fig. 3
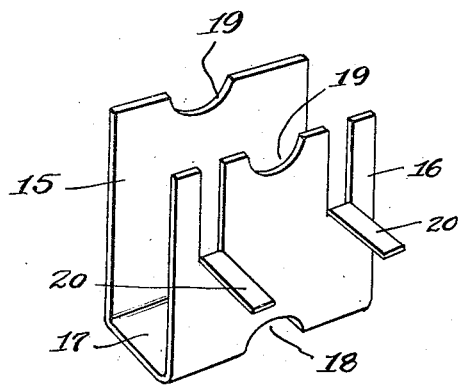
Fig. 4
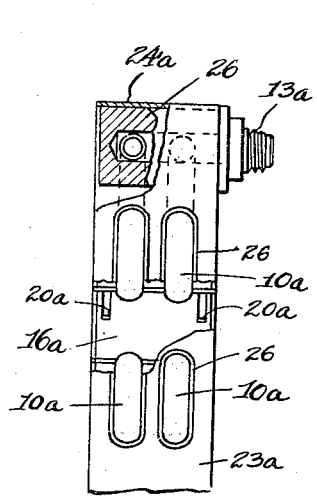
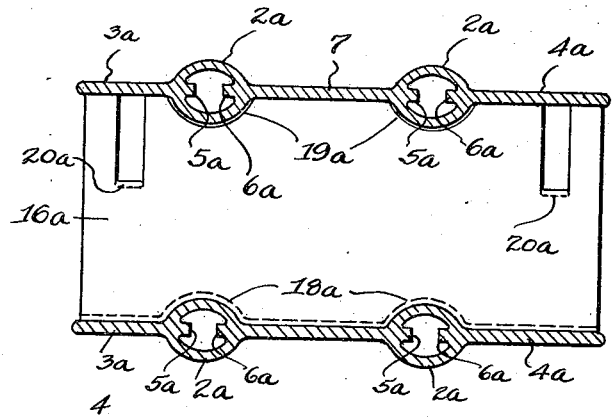
Fig. 6
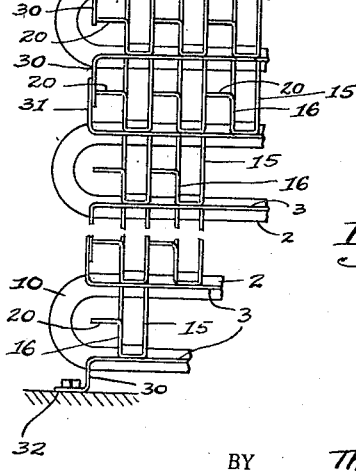
Fig. 7
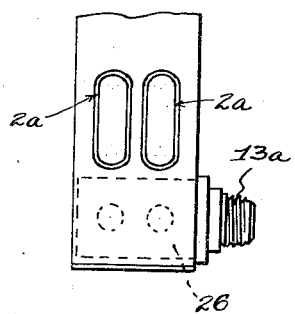
Fig. 5
INVENTORS
William W. Higham
Thomas S. Pendergast
BY
Barnes, Kisselle, Laughlin & Raisch
Attorneys Patented Aug. 25, 1942

2,294,030

UNITED STATES PATENT OFFICE 2,294,030

HEAT EXCHANGE DEVICE

William W. Higham and Thomas S. Pendergast, Detroit, Mich., assignors to Universal Cooler Corporation, Detroit, Mich., a corporation of Michigan Application March 9, 1940, Serial No. 323,082

4 Claims. (Cl. 257—149)

This invention relates to a heat exchange device for the transfer of heat from one fluid substance to another.

The heat transfer device is one useful in refrigeration of air conditioning. In refrigeration, for example, the device may be employed as an evaporator or cooling unit, particularly in commercial installations, such as large refrigerated cabinets or rooms or showcases or the like, while in connection with the domestic field this structure is thought to be most useful as a condenser.

The general objects of the invention are to provide a simple easily manufactured structure embodying a minimum number of parts, or a minimum number of different kinds of parts, and which has a high heat transfer efficiency. To these ends, a tubular formation preferably of extruded aluminum or aluminum alloy or other metals which lend themselves to the extrusion process, is provided, and the tubular formation has one or more extensions or flanges running lengthwise thereof. This tubular structure is fashioned into the desired form, shape and size with a plurality of runs, and between the runs heat dissipating or transferring elements are placed which afford a large area for contact for the ambient atmosphere or other fluid. These elements may be easily and quickly located, and each contacts with opposite runs of the tubular structure. The contact may be merely frictional or, if desired, may be made secure by suitable fastening or securing means or by the application of solder or other sealing metal. Structures for carrying out the invention are shown in the accompanying drawings.

Fig. 1 is a view largely in side elevation but with some parts in section illustrating a structure made in accordance with the invention.

Fig. 2 is an enlarged cross sectional view of the tubular structure and taken substantially on line 2—2 of Fig. 1.

Fig. 3 is an enlarged cross sectional view taken substantially on line 3—3 of Fig. 1.

Fig. 4 is a perspective view of a radiating element.

Fig. 5 is an end view of a modified form illustrating a double tube formation.

Fig. 6 is an enlarged sectional view showing details of the double tube formation.

Fig. 7 is a partial side elevational view illustrating a further modified arrangement.

In the form of the device shown in Fig. 1, the tubular structure which constitutes a conduit for a fluid is generally illustrated at 1, and as illustrated in Fig. 2, the tubular part is relatively centrally disposed as shown at 2 between two oppositely extending longitudinally running flanges 3 and 4. The interior of the tube may be provided with inwardly extending longitudinally running flanges 5 and 6, preferably disposed in line with the flanges 3 and 4, and in a sense constituting an integral extension of the exterior flanges. Any fluid in the tube contacts with the surfaces of the tube wall itself and with the internal flanges 5 and 6, these flanges providing an increased area of contact. Heat is readily transferred to the exterior flanges 3 and 4 through the integral metal constituted by the flanges 5 and 6, the tube wall and the exterior flanges 3 and 4.

This formation may advantageously and is preferably fashioned from extruded metal such as aluminum, aluminum alloy, or other metals suitable for this purpose, and this tubular structure is preferably made in lengths adequately long so that a single piece substantially, except for the ends, may constitute the conduit of a heat exchange device. Where large units are made more than one length of such stock may be used. This structure may then be fashioned back and forth after the manner shown in Fig. 1 to provide a series of runs, preferably parallel as indicated, with the tubular structure being bent reversely upon itself between the runs, the bend portions being indicated at 10. The flanges 3 and 4 are cut away or otherwise removed at the bends for purposes which will presently appear, although in some installations it may be preferable to leave the flanges intact. The leaving of the flanges on the tube at the bends is feasible because the bend is made in a direction so that the flanges are bent on their flat faces, so to speak, to distinguish from being bent edgewise. It will also be observed that the internal flanges 5 and 6 facilitate bending for the same reason. The ends of the tubular formation may be equipped with end pieces 11 and 12 by means of soldering, brazing or welding for the reception of suitable fittings, one of which is illustrated at 13.

A multiplicity of surface-providing elements for heat dissipation purposes, but which are all substantially identical, are placed between the runs. One of these is illustrated in Fig. 4. Each element advantageously comprises a piece of sheet metal fashioned into U-shape having one leg 15 and another leg 16 with a bight portion 17. The legs are preferably parallel, and the depth of the U, as shown in Fig. 3, is about the same or preferably just slightly less than the width of the tubular formation 1. The bight portion of the U is provided with a central depression or notch 18, while the legs are notched as at 19. One leg of each element, such as the leg 16, as illustrated, is formed with spacers 20 provided by cutting the metal and bending the spacers outwardly as indicated. These elements are assembled by sliding them into position between adjacent runs as indicated in Figs. 1 and 3. The notches 19 accommodate the tubular part 2 of one run, while the notch 18 accommodates the tubular part 2 of the next adjacent run.

The frame for the structure advantageously takes the form of a length of sheet metal fashioned to provide two vertical members 22 and 23 with a connecting member 24, while the ends of the members 22 and 23 may be fashioned to provide supporting feet 25. The frame is apertured as at 26 for the reception of the bends 10. Fittings such as the fitting 13 may be placed outside the frame as shown. The spacers of one element contact with the next adjacent element so that the elements are all uniformly spaced, and the spacers of the heat transfer elements which are positioned next adjacent the frame part 23 may contact with this part of the frame. In making the assembly the elements may be merely pushed into position, say from the right hand side of the structure shown in Fig. 1, until the spaces between the runs are filled to the desired extent.

In Figs. 5 and 6 a tubular structure of double formation is indicated. In this case there are two hollow cross sectional forms 2a with exterior flanges 3a and 4a, and an intervening web 7. Likewise the interior flanges 5a and 6a may be employed. In this case the sheet metal dissipating elements are of double width having notch formations for accommodating the tubular structures and spacers 20a. This tubular form may be fashioned into a shape like that shown in Fig. 1, with the heat transferring elements disposed between runs and with the whole mounted in a frame. This structure is illustrated in Fig. 5 where it will be noted that the reversely bent portions 10a project through holes or apertures 26a in the frame. The two tubes may be connected as desired, in series or in parallel, but as shown in Fig. 5, they are connected in parallel by means of headers 26 having outlets and inlets 13a. This form illustrates a multiple tube device, but it is to be understood that more than two tubular structures may be provided if desired.

In Fig. 7 a single tube formation is shown but the arrangement eliminates the use of a separate frame. In this form the flanges 3 and 4 are cut from the parts at the bends, but not entirely removed. The flanges, for example, on the uppermost run, are turned downwardly as at 30; the flange on the next two lower runs are turned downwardly and upwardly respectively as at 30 and 31, and so on until the flanges of the lowermost run are turned downwardly at 30, and then outwardly as at 32 to form a support. The overlapping flanges 30 and 31 are united by welding or otherwise so that, in this case, the flanges, in effect, form the supporting frame.

While a large number of inserted elements are used, they are all of the same formation and the result is that only very few different parts are used. Excluding the necessary coupling means at the ends of the tube, the structures of Figs. 1 and 5 comprise essentially the extruded tubular form, the inserts and frame, while in Fig. 7 there is only the tubular extruded form and inserts. A structure thus provided possesses a large area for heat transfer purposes, with the fluid or air outside the device contacting with the tubular form per se, its flanges 3 and 4, and the intermediate web 7 where a multiple tubular form is provided, as well also as both legs and the bight of the inserts. Even the spacers 20 serve as heat dissipaters. The inserts have direct contact with opposite runs so that heat is efficiently transferred. The inserts may merely have frictional engagement with the runs, or the locations of contact may be made more secure as by means of soldering or the like, which will facilitate the transfer of heat. Moreover, the internal flanges 5 and 6 provide an increased area for the interior fluid and a good heat transfer is obtained because of the integral metal between the internal and external flanges, as well also as the tube wall.

Some of the appended claims specify that the device is for refrigeration or the like, and this means the art of refrigeration broadly and includes domestic and commercial refrigeration, as well also as air conditioning.

We claim:

1. A heat transfer device for refrigeration or the like, comprising a strip of metal stock having one or more tubular formations and exterior flanges and fashioned into a plurality of runs, with the runs connected by reversely bent parts of the stock, a plurality of separate heat transferring elements disposed between adjacent runs and adapted to be individually slidingly positioned by movement lengthwise along the runs, and each comprising a relatively thin piece of metal fashioned substantially into U-shape and having a depth comparable to the width of the stock, the bright portion of the U having an extent substantially corresponding to the width of the U and being arranged to contact with one run and the ends of the legs of the U arranged to contact with the adjacent run, and one or more spacers on each element for contacting with the next adjacent element.

2. A heat transfer device for refrigeration or the like, comprising a strip of metal stock having one or more tubular formations and exterior flanges and fashioned into a plurality of runs, with the runs connected by reversely bent parts of the stock, a plurality of separate heat transferring elements disposed between adjacent runs and adapted to be slidingly positioned by movement lengthwise along the runs, and each comprising a relatively thin piece of metal fashioned substantially into U-shape and having a depth comparable to the width of the stock, the bight portion of the U being substantially as wide as the width of the U and having a depression therein for accommodating the tubular portion of one run, and the ends of the legs of the U having each a recess for accommodating the tubular portion of adjacent runs, and said elements being arranged to contact with the tubular portion and flanges of adjacent runs, and one or more struck-out tongues on each element for contacting with an adjacent element for spacing the elements.

3. A heat transfer device for refrigeration or the like comprising, a strip of metal stock having a tubular formation and exterior flange means, said stock being fashioned into a plurality of runs with the runs connected by substantially reversely bent parts of the stock, the flange means being severed from the tubular formation substantially at the reversely bent portions, the said severed flange means of adjacent runs being fashioned through substantially 90° to extend toward each other and being secured together to form a frame structure.

4. A heat transfer device for refrigeration or the like comprising, a strip of metal stock having a tubular formation and exterior flange means, said stock being fashioned into a plurality of runs with the runs connected by substantially reversely bent parts of the stock, the flange means being severed from the tubular formation substantially at the reversely bent portions, the said severed flange means of adjacent runs being fashioned through substantially 90° to extend toward each other and being disposed in overlapping relationship and united to form a frame structure.

WILLIAM W. HIGHAM.
THOMAS S. PENDERGAST.